United States Patent [19]

Gossett et al.

[11] 3,831,757

[45] Aug. 27, 1974

[54] WATER PURIFYING AND DISTRIBUTING SYSTEM

[76] Inventors: Charles W. Gossett, 14025 Crenshaw Blvd., Hawthorne, Calif. 90250; William J. Dauenhauer, P.O. Box 487, Gualala, Calif.

[22] Filed: Oct. 18, 1972

[21] Appl. No.: 298,501

[52] U.S. Cl. ................... 210/143, 210/257, 210/321
[51] Int. Cl. .......................................... B01d 31/00
[58] Field of Search ............. 210/23, 257, 321, 143

[56] References Cited
UNITED STATES PATENTS

| | | | |
|---|---|---|---|
| 3,630,378 | 12/1971 | Bauman | 210/257 |
| 3,679,055 | 7/1972 | Clark et al. | 210/257 X |
| 3,688,911 | 9/1972 | Baerg | 210/321 |
| 3,719,593 | 3/1973 | Astil | 210/321 X |

Primary Examiner—Frank A. Spear, Jr.

[57] ABSTRACT

A system of repetitively replenishing a reserve supply in a reservoir of product water discharged from a reverse osmosis module, the input of which is connected to a valve-controlled conventional water service line and the output of which is in communication with said reservoir and a valve controlled product dispensing line.

5 Claims, 5 Drawing Figures

WATER PURIFYING AND DISTRIBUTING SYSTEM

In recent years considerable attention has been devoted to the provision of means for providing homes with near pure water for use in drinking, cooking, ice making and other water uses. Among the developments heretofore provided are the reverse osmosis systems for effecting the chemical separation of ingredients contained in fluids including but not limited to the purification of water. One of the principal disadvantages of reverse osmosis is that the product water or permeate is produced at near zero pressure requiring, as a consequence, extraneous means for providing the energy to effect the dispensing of the product water, such as means to afford gravity flow or the employment of power driven pumps in a distributing system. Our present invention obviates all of the disadvantages of prior water purification and distribution systems and affords relatively simple means at an inexpensive cost of installation and maintenance for providing near pure water and distributing the same in such locations as dwellings, mobile homes or office and other buildings occupied by users of water.

A primary object of our present invention is to provide an improved water purifying and distributing system which contains a self-sustaining reserve supply of near pure water at all times.

Another important obnect of the invention is to provide an improved water purifying and distributing system of the indicated nature which is additionally characterized by the inclusion therein of an automatically operable shut-off valve in a water service line thereby saving loss of water and attendant expense.

A still further object of our invention is to provide an improved water purifying and distributing system of the aforementioned character which includes a minimum of parts having little or no wear in the operation of the system which is operable at practically no cost where the energy is derived from a conventional water service line.

Other objects of the invention together with some of the advantageous features thereof, will appear from the following description of the invention illustrated in the accompanying drawings as an exemplification of the best mode of constructing the invention and the manner of using the same. It is to be understood that the appended claims are intended to cover the embodiment illustrated as well as variations therefrom within the scope of the invention.

Referring to the drawings.

In its preferred form and as a best mode of construction, our invention preferably comprises, in combination with a valve-controlled water supply line and a reverse osmosis module connected into said line, a water distribution line in communication with the water product outlet orifice of said reverse osmosis module, a manually operable valve in said water distribution line for dispensing the water product of said module therefrom, together with a reservoir connected into said water distribution line for maintaining a reserve supply of the water product of said module, and automatically operable means in said reservoir for automatically replenishing the supply of said water product therein upon opening said dispensing valve in said water distribution line, and a control lever connected to and actuated by said automatically operable means for shutting off and opening the valve in said water supply line to control water flow to said module.

Figure 1:
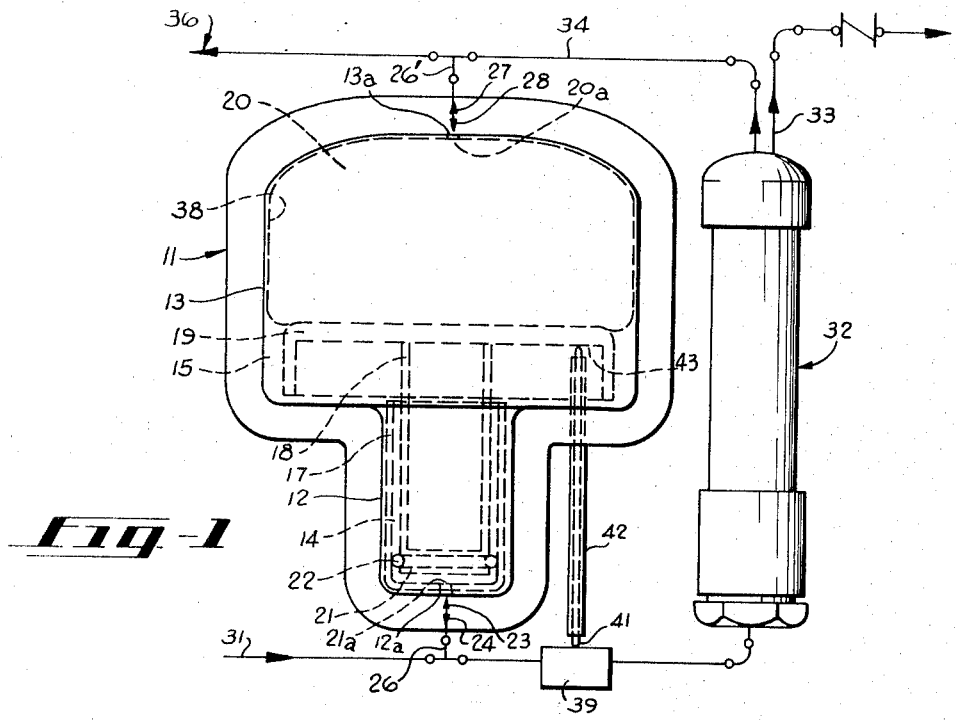
FIG. 1 is a schematic flow sheet with diagrammatic illustration of the components of an embodiment exemplifying the best mode of construction and manner of using our invention.
Figure 2:
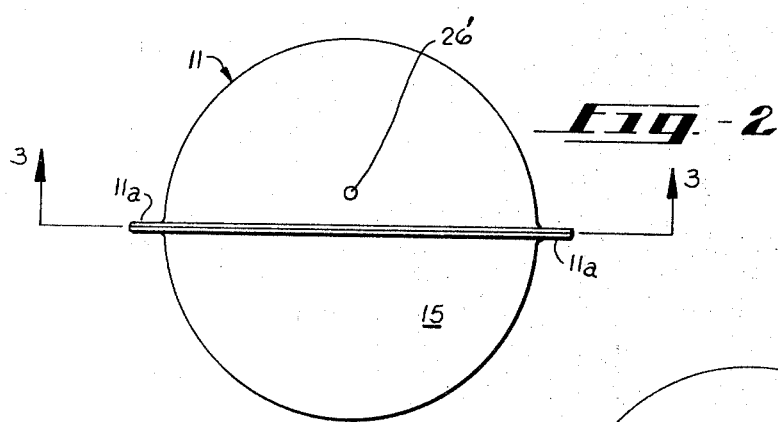
FIG. 2 is a top plan view of the reservoir component of our invention.
Figure 5:
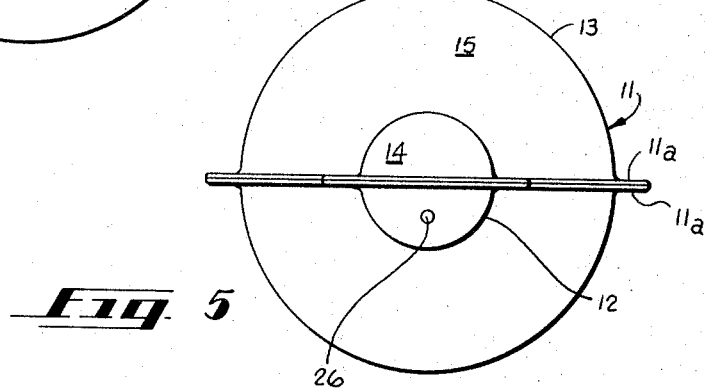
FIG. 5 is a bottom plan view of the lower compartment in relation to the outer reservoir and the filled bag component, this view being taken in the direction of the lines 5—5 of FIG. 4.
Figure 3:
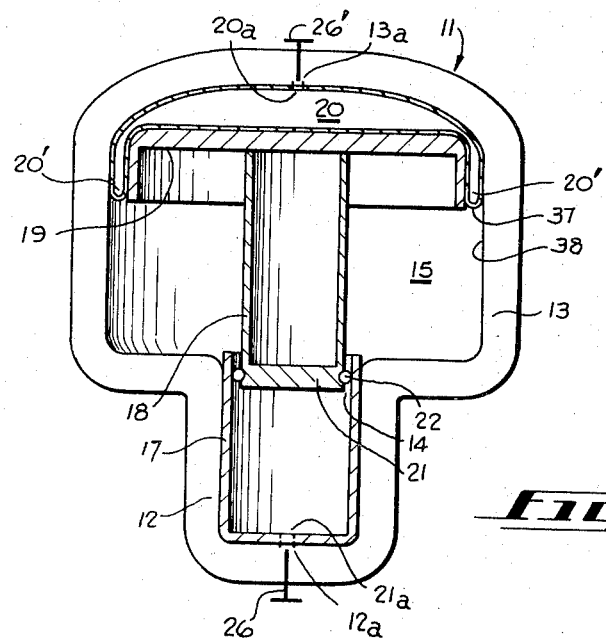
FIG. 3 is a sectional view of the elements installed in the reservoir, this view being a view of the reservoir shown in full lines and taken on the line 3—3 of FIG. 2 with the interior lower chamber filled and the interior collapsible bag component empty.
Figure 4:
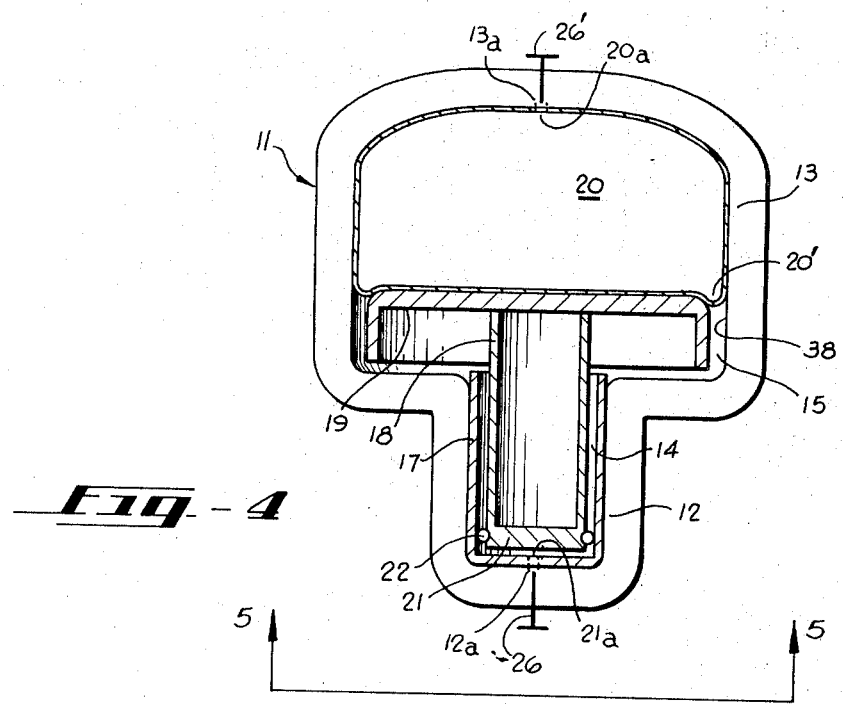
FIG. 4 is a view similar to FIG. 3 but showing different positions of the elements installed within the reservoir; this view illustrating a filled bag component and the lower chamber empty.

As particularly illustrated in FIGS. 1, 3 and 4 of the annexed drawings, we provide a specially constructed body 11 which conveniently is molded from a relatively strong and durable plastic material affording a relatively thick wall, such as acrobutadiene-styrene, which is hereafter termed 1/8 inch ABS plastic. The body is so molded as to provide two symmetrical halves each having an outwardly projecting flange 11a thereon whereby the two halves can readily be joined together by passing bolts through the flanges and tightening down nuts on the bolts, all not shown. When connected together, the two halves provide a body 11 with a relatively small hollow section 12 and a relatively large hollow section 13 defining circular spaces 14 and 15, respectively of small diameter and large diameter, as clearly shown in FIGS. 1, 3 and 4.

In accordance with our invention, we dispose within the relatively small space 14 a cylinder 17 which slidably receives a lower piston 18 and we dispose within the relatively large area 15 an upper piston 19 which supports thereon a collapsible bag 20 constituting in and of itself a reservoir. The lower cylinder 18 is cast with a thick circular base 21 having an interior annular groove therein for the reception of an O-ring 22 made of "Teflon" or like material. The lower cylinder 17 constitutes one assembly, and the lower piston 18, the upper piston 19 and the base 21 of the lower piston constitute another assembly; the two assemblies together with the collapsible bag 20 being entirely enclosed within the body 11. The bag 20 is molded from any suitable water-tight plastic material of sufficient strength to carry a volume of water or other fluid yet pliable enough to collapse when emptied of water, such as polyvinyl chloride or the like. The lower piston 18 with its base 21 and the upper piston 19 can conveniently be cast from a metal such as aluminum, or formed from any other suitable material capable of withstanding approximately 10 to 50 pounds per square inch (psi), such as plywood, masonite, steel or any suitable polystyrene plastic.

As indicated by the small arrows 23 and 24 in FIG. 1 of the annexed drawings, the flow of tap water is in two directions into and out of the cylinder 17 through aligned openings 12a and 21a formed in the bottom of lower section 12 and centrally of the base of cylinder 17, respectively; such aligned openings being placed in communication with one another by means of a tee-connection shown schematically at 26. Moreover, as indicated by the small arrows 27 and 28 the flow of near pure water is in two directions into and out of the collapsible bag 20 through aligned openings 13a and 20a formed in the large section 13 of body 11 and centrally of the collapsible bag 20, respectively; such aligned opening being placed in communication with one another by a tee-connection shown schematically at 26'.

As illustrated in the schematic showing of our improved system in FIG. 1, untreated or impure water is or may be supplied from any source such as from a storage tank, not shown, or from a conventional water service line as a part of a community water distribution system, as indicated by the reference numeral 31 wherein water is supplied normally under a pressure of approximately 60 psi, more or less. In our system, at least one standard reverse osmosis module 32 is connected into water service line 31; such one or more modules 32 functioning to separate out impurities from the supplied water, rejecting them with a portion of the water that is fed thereinto and that passes over the top of a perforated cellulose acetate film or membrane, not shown, to be discharged as concentrate through drain pipe 33 while a portion of the feed water is forced through the pores of the film to be passed out of the module as the permeate or nearly pure water through distributing pipe 34. The pipe 34 can be tapped by one or more manually operable valves, as indicated by the reference numeral 36 in FIG. 1 which, when opened allows a quantity of the nearly pure water to be withdrawn either as drinking water, cooking water or other water such as for ice making.

Inasmuch as the collapsible bag 20 is in communication with water distribution line 34 by virtue of a tee connection 26' establishing communication between the interior of the bag through aligned openings 13a and 20a in the body section 13 and bag 20, respectively, such bag 20 is filled to capacity with nearly pure water delivered under forced pressure from the reverse osmosis module 32. With all taps such as tap 36, in dispensing line 34 closed and the bag 20 filled, the system is in stable equilibrium with no flow of water until tap 36 is opened. It should be observed here that with bag 20 filled, the upper piston 19 in body 11 has been displaced and forced downwardly to its extreme lowered position with an annular flange 20' of the bag 20 filling the annular space 37 between the perimeter of upper piston 19 and the wall 38 of upper chamber or space 15. The lowering of upper piston 19 will automatically move the lower piston 18 into the cylinder 17 to cause the impure water therein to flow out of openings 21a and 12a in the direction of arrow 23 into the supply line 31 through tee connection 26. The water line 31 is provided with a normally open spring-loaded valve 39 with upper piston 19 as well as lower piston 18 in their extreme lowered positions. Also, we provide in association with upper piston 19 a reciprocable plunger 41 which is freely mounted for up and down movement within a guide 42 which is screwed into a threaded opening, not shown, in the body 11 and supported in a vertical position with plunger 41 in engagement with the underside 43 of the upper piston 19 to hold the valve 39 closed against the action of its associated spring, not shown, when the piston 19 is in its extreme lowered position.

In operation, whenever nearly pure water is dispensed from a tap 36 of distributing pipe 34, the bag 20 empties and the shut-off valve 39 in water supply line 31 opens to cause water to flow in such line not only through tee connection 26 into the cylinder 17 but also through opened valve 39 to the reverse osmosis module 32. Water entering cylinder 17 causes the lower piston 18 to rise and at the same time causes the connected upper piston 19 to rise to collapse the bag 20. In this action, the plunger 41 in guide 42 is permitted to rise further to increase the opening of valve 39. The emptying of bag 20 can be continuous so that all of the reserve nearly pure water therein is used. Or, the tap 36 can be opened briefly and closed again so that the reserve supply of nearly pure water in the bag 20 is only gradually depleted. Once the tap 36 is closed, the flow of impure water in supply line 31 will start again and pass through partially open or fully open valve 39 therein to again cause the feeding of impure water to the reverse osmosis module 32 which, in turn, refills the bag 20 to its capacity again of the nearly pure water. This cycle is repeated again and again upon the opening of tap 36, and the automatic operations of the self-contained pistons 18 and 19 confined within the body 11 but free to move up and down in response to the emptying and refilling of the collapsible bag 20.

It is of course to be understood that when our improved water distribution system is installed other than in homes where water dispensing is required in greater volume in a given time interval, a ⅛ inch to ⅝ inch ABS plastic body 11 can be made to a much greater size than required for a normal family dwelling, and a battery of reverse osmosis modules can be employed in a supply line of impure water delivered under pressure.

We claim:

1. A water purifying and distributing system comprising, in combination with a water supply line and with a reverse osmosis module connected into said line for receiving water from said water supply line and for removing impurities therefrom to provide a nearly pure water product at its outlet orifice, a faucet-controlled water distribution line in communication with the nearly pure water product outlet orifice of said reverse osmosis module for dispensing the water product of said reverse osmosis module, a hollow body defining an interior lower space and an adjacent interior upper space, a cylinder occupying said lower space and in communication with said water supply line, a lower piston slidably mounted in said cylinder, an upper piston in said upper space connected to said lower piston and movable in unison therewith, a depletable and replenishable water reservoir seated on said upper piston and connected into and in communication with said water distribution line for receiving and temporarily holding a reserve supply of the nearly pure water product of said reverse osmosis module, a spring-loaded valve in said water supply line, and automatically operable means connected to said upper piston for opening said spring-loaded valve and for controlling the supply of nearly pure water product of said reservoir in response to the opening and closing of the faucet in said water distribution line.

2. A water purifying and distributing system as set forth in claim 1, wherein said automatically operable means comprises a control plunger for engaging said spring-loaded valve in response to the depletion of the nearly pure water in said reservoir upon the dispensing of water from said water distribution line.

3. A water purifying and distributing system as set forth in claim 2, and a guide mounted on said body within which said control plunger is reciprocated to engage and to disengage said spring-loaded valve in said water supply line in response to the depletion and replenishment of nearly pure water in said reservoir.

4. A water purifying and distributing system as set forth in claim 1 wherein said reservoir comprises a collapsible bag and wherein said automatically operable means in said body is actuated upon depletion in said bag of the reserve supply of the nearly pure water product of said reserve osmosis module by the opening of the faucet in said water distribution line to thus effect the filling of said cylinder with unpurified water from said water supply line and also to effect opening of said spring-loaded valve in said water supply line whereby said reverse osmosis module is repetitively activated to deliver nearly pure water on each cycle of operation to refill said collapsible bag.

5. A water purifying and distributing system as set forth in claim 1 wherein said lower piston and said upper piston are confined within said body and said reverse osmosis module is exteriorly of said body and separately connected into said water supply line for ready removal and replacement, repetitive replenishing of said reservoir after dispensing water by opening the faucet in said water distribution line exerting a back pressure on the outlet side of the reverse osmosis module to effect a flushing operation to cleanse said module.

* * * * *